United States Patent
Jung et al.

(10) Patent No.: US 7,294,941 B2
(45) Date of Patent: Nov. 13, 2007

(54) WINDING COIL ASSEMBLY OF RECIPROCATING MOTOR AND MANUFACTURING METHOD THEREOF

(75) Inventors: Won-Hyun Jung, Gyungsangnam-Do (KR); Sun-Ki Yoon, Busan (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 10/532,872

(22) PCT Filed: Oct. 21, 2003

(86) PCT No.: PCT/KR03/02207

§ 371 (c)(1),
(2), (4) Date: Apr. 28, 2005

(87) PCT Pub. No.: WO2004/040594

PCT Pub. Date: May 13, 2004

(65) Prior Publication Data

US 2006/0097586 A1    May 11, 2006

(30) Foreign Application Priority Data

Nov. 1, 2002  (KR)  ............ 10-2002-0067538

(51) Int. Cl.
*H02K 33/00*  (2006.01)
*H02K 35/00*  (2006.01)
*F04B 17/04*  (2006.01)

(52) U.S. Cl. .................... 310/15; 417/417
(58) Field of Classification Search ............ 310/15, 310/43, 45, 191
See application file for complete search history.

(56) References Cited

U.S. PATENT DOCUMENTS

| | | | | |
|---|---|---|---|---|
| 2,307,588 A | * | 1/1943 | Jackson et al. | 428/379 |
| 2,626,223 A | * | 1/1953 | Ford et al. | 525/421 |
| 3,493,413 A | * | 2/1970 | Filius et al. | 428/383 |
| 3,676,814 A | * | 7/1972 | Trunzo et al. | 336/205 |
| 3,695,929 A | * | 10/1972 | Sattler | 428/383 |

(Continued)

FOREIGN PATENT DOCUMENTS

JP   9-129470 A   5/1997

(Continued)

OTHER PUBLICATIONS

Patent Abstracts of Japan, vol. 97, No. 9, Sep. 20, 1997.

*Primary Examiner*—Tran Nguyen
(74) *Attorney, Agent, or Firm*—Birch, Stewart, Kolasch & Birch, LLP

(57) ABSTRACT

A winding coil assembly (6) of a reciprocating motor comprising: an outer stator; an inner stator (2) arranged at an inner circumference surface of the outer stator (2) with a certain air gap; a magnet linearly and movably arranged between the outer stator and the inner stator; and a winding coil (20) mounted on either the outer stator or the inner stator, wherein the winding coil (20) is formed as a ring shape by being wound a coil (20) with a plurality of turns, and the coil (20) is molded by a molding material (22). According to this, the coil (20) is prevented from being deformed at the time of winding operation and can be manufactured to have a minute dimension, so that the number of components can be reduced and thereby a manufacture cost can be reduced.

2 Claims, 7 Drawing Sheets

U.S. PATENT DOCUMENTS

| | | | |
|---|---|---|---|
| 3,842,192 A | * | 10/1974 | Hilker et al. .......... 174/120 SR |
| 4,037,312 A | * | 7/1977 | Deis ............................ 29/598 |
| 4,127,695 A | * | 11/1978 | Hirakawa et al. ........... 428/371 |
| 4,376,710 A | * | 3/1983 | Gardos et al. .............. 508/128 |
| 5,337,941 A | * | 8/1994 | Higashiura et al. ......... 228/205 |
| 5,582,020 A | * | 12/1996 | Scaringe et al. .............. 62/102 |
| 5,965,263 A | | 10/1999 | Tatematsu et al. |
| 6,700,234 B2 | * | 3/2004 | Hashimoto et al. ........... 310/45 |
| 6,774,511 B2 | * | 8/2004 | Chochoy et al. .............. 310/43 |
| 6,882,075 B2 | * | 4/2005 | Do et al. ..................... 310/194 |

FOREIGN PATENT DOCUMENTS

| | | |
|---|---|---|
| JP | 09129470 A * | 5/1997 |
| WO | WO-02/087060 A1 | 10/2002 |

\* cited by examiner

WINDING COIL ASSEMBLY OF RECIPROCATING MOTOR AND MANUFACTURING METHOD THEREOF

TECHNICAL FIELD

The present invention relates to a reciprocating motor, and more particularly, to a winding coil assembly of a reciprocating motor which can simplify manufacturing processes and prevent a deformation of a winding coil, and a manufacturing method thereof.

BACKGROUND ART

FIG. 1 is a sectional view of a general reciprocating compressor.

The reciprocating compressor comprises: a hermetic case 106 where a suction pipe 102 and a discharge pipe 104 are connected to each other; a reciprocating motor 108 arranged in the case 106 for generating a reciprocating motion power; and a compressing unit 110 for compressing a fluid by receiving the reciprocating motion power generated from the reciprocating motor 108.

The reciprocating motor 108 includes: an outer stator 112 having a cylindrical shape accordingly as a plurality of thin lamination sheets are radially stacked; an inner stator 114 arranged at an inner circumference surface of the outer stator 112 with a certain gap and having a cylindrical shape accordingly as a plurality of thin lamination sheets are radially stacked; magnets 116 arranged in a circumference direction between the outer stator 112 and the inner stator 114; and a magnet frame 120 to which the plurality of magnets 116 are fixed and the magnet frame 120 connected to a piston 118 which is to be reciprocated.

A winding coil assembly 124 for forming a flux between the outer stator 112 and the inner stator 114 when a power is applied is mounted to the outer stator 112.

As shown in FIG. 2, the winding coil assembly 124 includes: a bobbin 130 having a cavity 132 at an outer circumference surface thereof; a coil 134 wound on the cavity 132 of the bobbin 130 by a plurality of turns and fixed to the bobbin 130; and a cover 136 mounted at an outer circumference surface of the bobbin 130 on which the coil 134 is wound, and for covering the coil 134.

Herein, the bobbin 130 is manufactured by an injection molding with a plastic material, and the cover 136 is also formed with the same plastic resin as the bobbin 130.

Manufacturing processes of the winding coil assembly 124 will be explained as follows. As shown in FIG. 3, the bobbin 130 is manufactured by an injection molding as a ring shape having the cavity 132 at the outer circumference surface thereof. Next, the coated coil 134 is wound on the cavity 132 of the bobbin 130 by a plurality of turns, and then the cover 136 is mounted on the outer circumference surface of the bobbin 130. Subsequently, the winding coil is put in a die 138 and manufactured by a die casting method.

However, in the winding coil assembly of a reciprocating motor in accordance with the conventional art, since the bobbin 130 is formed with a plastic material, an intensity of the bobbin 130 is weak thus to have a problem that a deformation may occur when the coil 134 is wound on the cavity 132 of the bobbin 130. Besides, a winding intensity of the coil 134 has to be properly controlled, thereby having difficult assembly processes.

Also, in order to wind the coil 134, the bobbin 130 and the cover 136 are required, so that the number of components is increased and thereby a manufacturing cost is increased.

Besides, the coil 134 is wound on the bobbin 130 and then the cover 136 is mounted thereon and manufactured by the die 138 casting, so that manufacturing processes are complicated, the number of processes is increased, and thereby a manufacturing cost is increased whereas a productivity is lowered.

DISCLOSURE OF THE INVENTION

Therefore, it is an object of the present invention to provide a winding coil assembly of a reciprocating motor which can prevent a coil from being deformed at the time of winding, minutely manufacture a coil dimension, and increase a winding intensity.

Another object of the present invention is to provide a winding coil assembly of a reciprocating motor which can reduce the number of components and thus reduce a manufacturing cost.

Still another object of the present invention is to provide a winding coil assembly of a reciprocating motor which can simplify manufacturing processes of a winding coil and thus enhance a productivity.

To achieve these objects, there is provided a winding coil assembly of a reciprocating motor comprising: an outer stator; an inner stator arranged at an inner circumference surface of the outer stator with a certain air gap; a magnet linearly and movably arranged between the outer stator and the inner stator; and a winding coil mounted on either the outer stator or the inner stator, wherein the winding coil is formed as a ring shape by being wound a coil with a plurality of turns, and the coil is molded by a molding material.

The coil is manufactured by coating polyester imide layer on a surface of cooper wire, coating polyamide imide layer on the surface of the polyester imide layer, and coating self-lubricating polyamide layer on the surface of the polyamide imide layer.

A manufacturing method of the reciprocating motor according to the present invention comprises the steps of: winding a coil on a jig; firstly molding the wound coil; separating the firstly molded winding coil from the jig; and secondly molding the winding coil separated from the jig.

The first molding is performed by heating the coil wound on the jig, thus melting the self-lubricating polyamide layer stacked at the outermost side of the coil, and thereby bonding gaps between the coils.

The second molding is performed by inserting the winding coil into a cavity of a die and then injecting molten metal into the cavity.

MODES FOR CARRYING OUT THE PREFERRED EMBODIMENTS

Hereinafter, one embodiment of a reciprocating motor according to the present invention will be explained with reference to the attached drawings.

Even if several embodiments of the reciprocating motor according to the present invention can exist, the most preferred embodiment will be explained.

Figure 1:
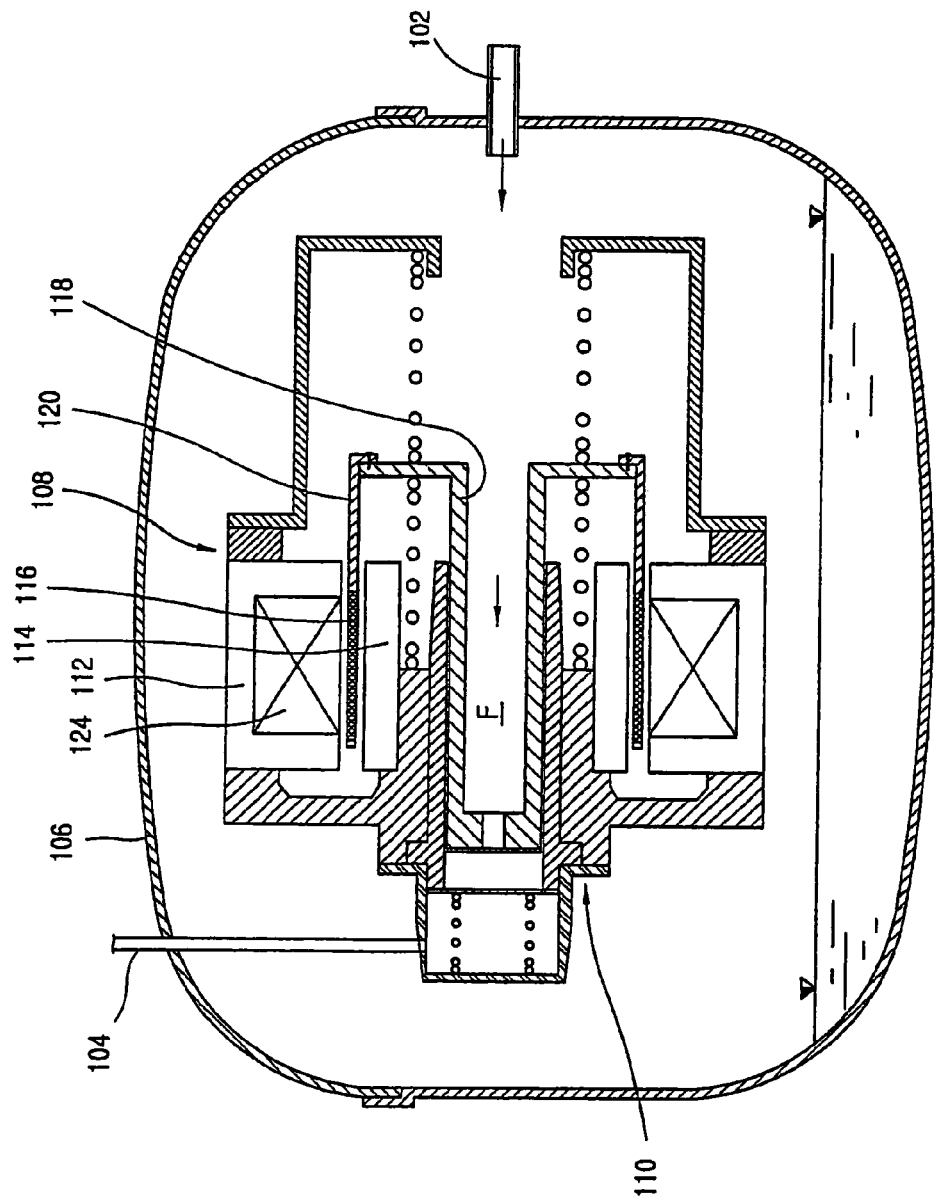
FIG. 1 is a sectional view of a general reciprocating compressor.
Figure 2:
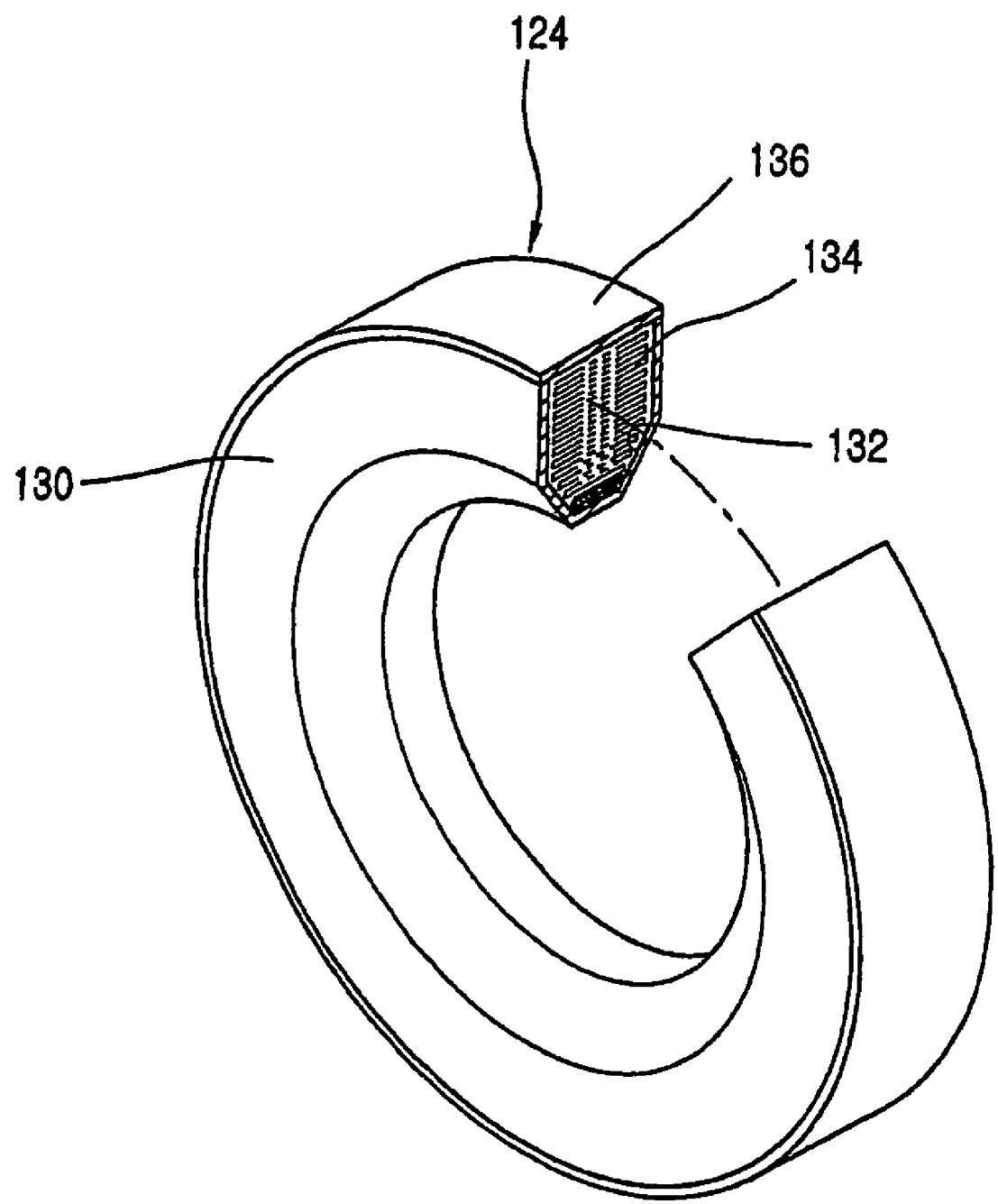
FIG. 2 is a perspective view of a winding coil assembly of a reciprocating motor in accordance with the conventional art.
Figure 3:
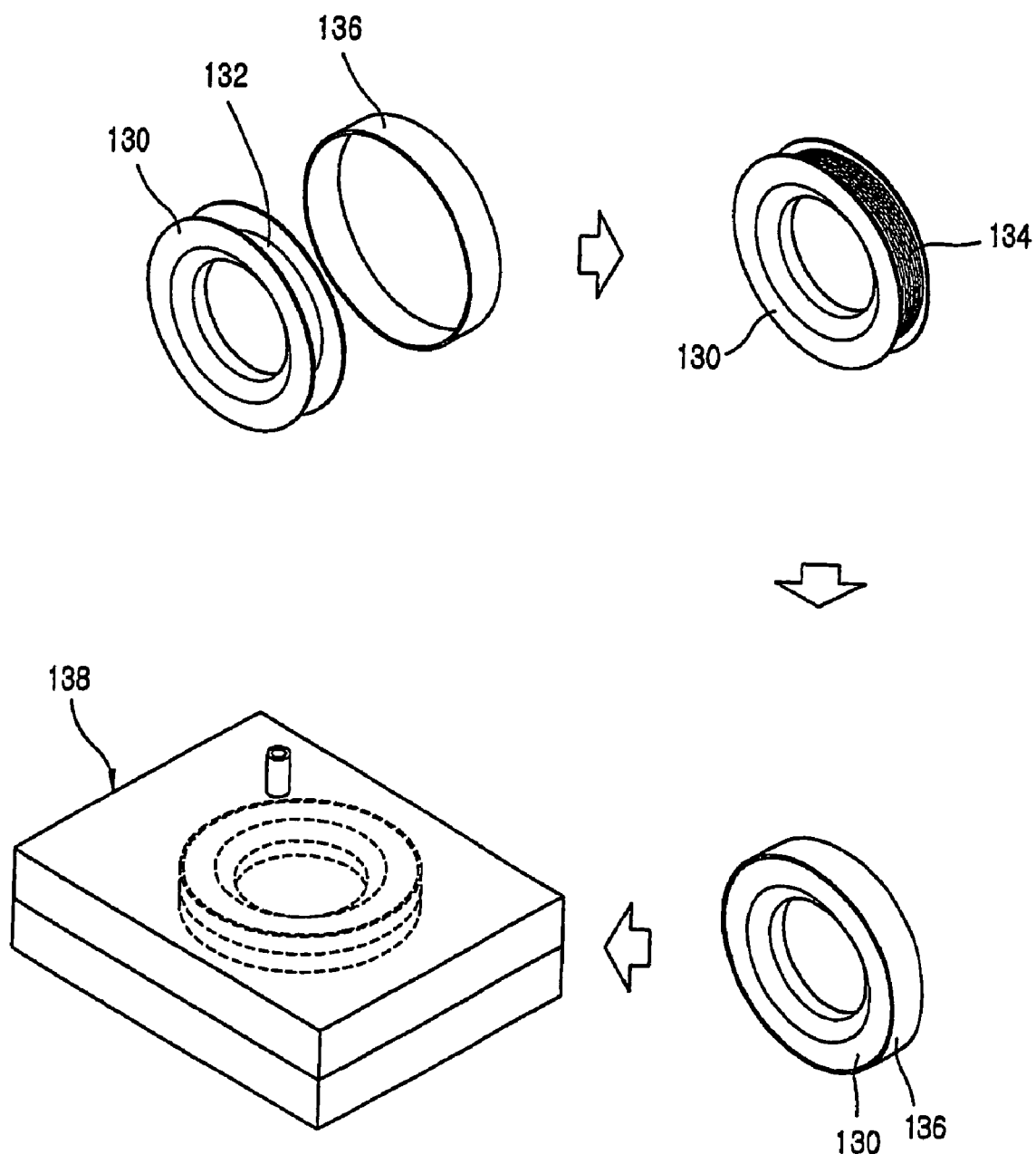
FIG. 3 is a view showing processes for manufacturing a winding coil of a reciprocating motor in accordance with the conventional art.
Figure 4:
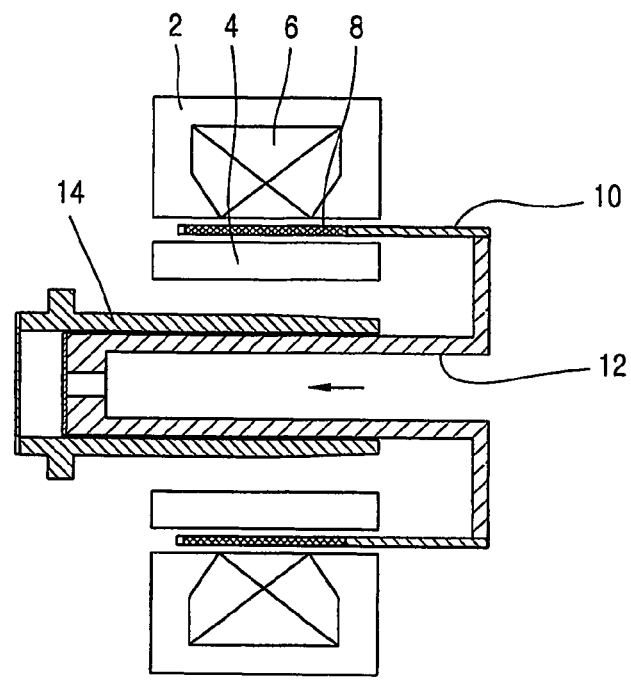
FIG. 4 is a sectional view of a reciprocating motor according to one embodiment of the present invention.

FIG. 4 is a sectional view of a reciprocating motor according to one embodiment of the present invention.

The reciprocating motor according to the present invention comprises: an outer stator 2 having a cylindrical shape accordingly as a plurality of lamination sheets are radially stacked; an inner stator 4 arranged at an inner circumference surface of the outer stator 2 with a certain gap thus to form a flux between the outer stator 2 and having a cylindrical shape accordingly as a plurality of lamination sheets are radially stacked; a winding coil assembly 6 mounted on either the outer stator 2 or the inner stator 4; a magnet 8 linearly and movably arranged between the outer stator 2 and the inner stator 4; and a magnet frame 10 connected between the magnet 8 and a piston 12 which is to be reciprocated thus for transmitting a reciprocating motion of the magnet 8 to the piston 12.

Herein, in case that the reciprocating motor is applied to a reciprocating compressor, the piston 12 linearly reciprocates in the cylinder 14 for compressing.

The winding coil assembly according to the present invention is mounted to the outer stator 2.

Figure 5:
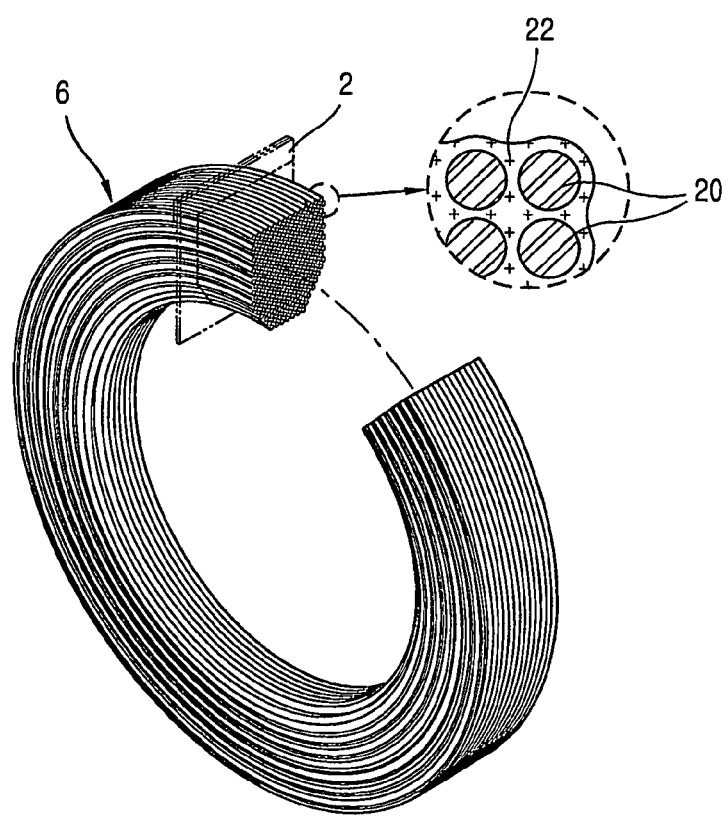
FIG. 5 is a perspective view of a winding coil assembly of a reciprocating motor according to one embodiment of the present invention.

As shown in FIG. 5, the winding coil assembly 6 is formed as a circular shape having a certain thickness and a width accordingly as the coil 20 is wound by a plurality of turns, and a molding material 22 for insulating gaps between the coils 20 and maintaining a shape of a wound coil is placed between the coils 20.

Figure 6:
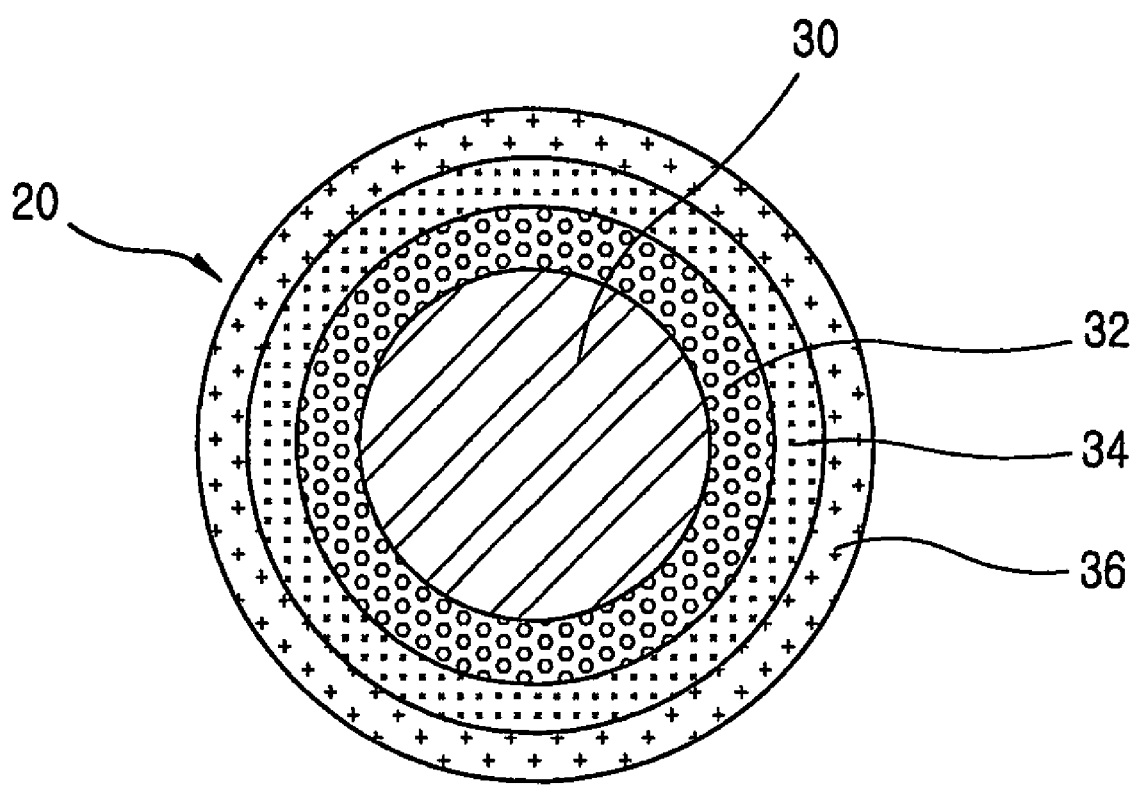
FIG. 6 is a sectional view of a winding coil according to one embodiment of the present invention.

The coil 20 before winding, as shown in FIG. 6, is constituted with a copper wire 30, a polyester imide layer 32 stacked on the surface of the copper wire 30, a polyamide imide layer 34 stacked on the surface of the polyester imide layer 32, and a self-lubricating polyamide layer 36 stacked on the surface of the polyamide imide layer 34.

As another embodiment of the coil, it is possible that the polyester imide layer 32 and the self-lubricating polyamide layer 36 are sequentially stacked on the surface of the copper wire 30, or the polyamide imide layer 34 and the self-lubricating polyamide layer 36 are sequentially stacked on the surface of the copper wire 30.

The polyester imide layer 32 improves an insulating characteristic with the copper wire 30 since the lamination sheets are directly stacked on the outer circumference surface of the wound coil 20. Also, the polyamide imide layer 34 enhances a physical strength of the wound coil 20 in order to additional bobbins and etc. are not required. Besides, the self-lubricating polyamide layer 36 makes the reciprocating motor resist against a compression condition of high temperature and high pressure when the reciprocating motor is applied to the compressor.

Manufacture processes of the winding coil assembly will be explained as follows.

FIGS. 7A to 7D are views showing manufacture processes of a winding coil assembly according to one embodiment of the present invention.

Figure 7A:
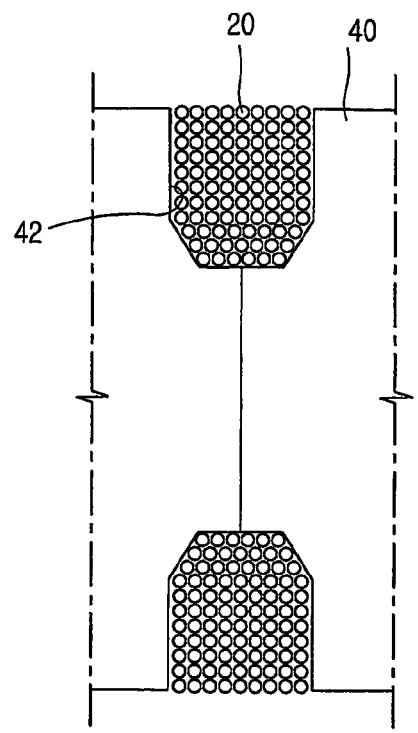
FIG. 7A to 7D are views showing processes for manufacturing a winding coil assembly of a reciprocating motor according to one embodiment of the present invention.

First, as shown in FIG. 7A, a jig 40 having a cavity 42 where the coil 20 is wound in a circumference direction is prepared, and then the coil 20 is wound on the cavity 42 of the jig 40 by the desired number of turns. Herein, the jig 40 has an intensity of a certain degree, so that a winding intensity of the coil 20 can be freely controlled and the number of winding and a shape of the coil 20 can be freely set.

Figure 7B:
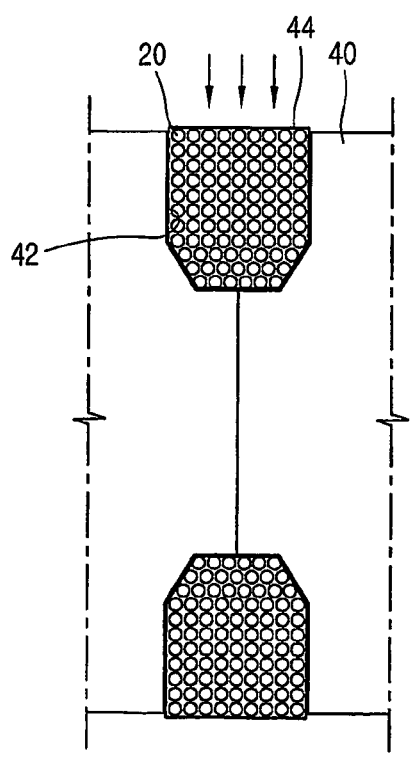

Under this state, as shown in FIG. 7B, a first molding layer 44 formed surface of the coil 20 for bonding between the coils 20 by heating the coil 20 wound on the jig 40 by applying an electric current or other method. That is, when the wound coil 20 is heated, the self-lubricating polyamide layer 36 is coated on the outermost side of the coil 20 is melted thus to form the first molding layer 44 for bonding between the coils 20.

Figure 7C:
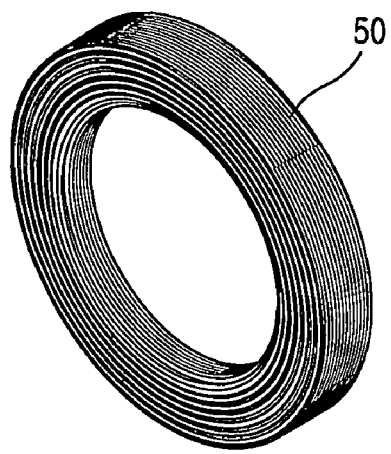
Figure 7D:
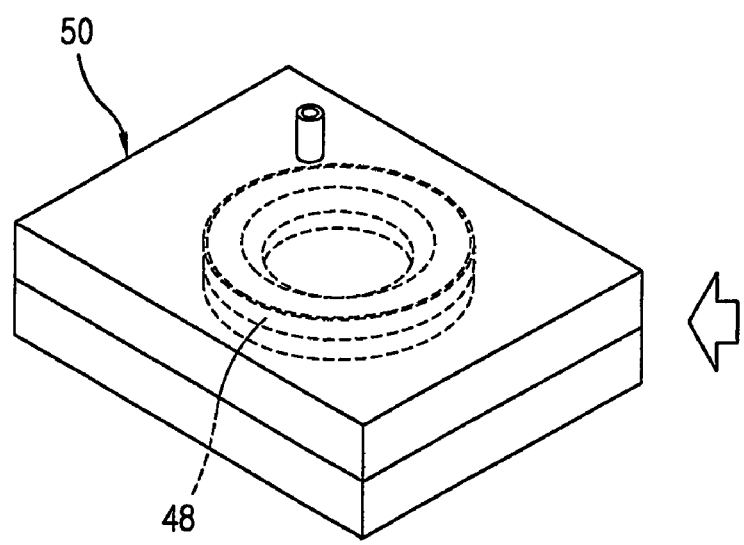

When the first molding is completed, as shown in FIG. 7C, the winding coil 20 where the first molding layer 44 is formed is separated from the jig 40. Then, as shown in FIG. 7D, the winding coil 20 separated from the jig 40 is inserted into a die 50 having a round cavity 48 and then molten metal of an insulation material is injected thereto, thus a second molding of the winding coil 20 is performed and thereby the winding coil assembly is manufactured.

The winding coil assembly of a reciprocating motor can freely control a winding intensity of the coil wound on the jig by firmly manufacturing the jig thus to facilitate a winding operation of the coil, to prevent the coil from being deformed at the time of winding, and to maintain a dimension of the winding coil accurately.

Also, additional components, that is, bobbins and covers are not required at the time of manufacturing the winding coil, so that a manufacture cost can be reduced, manufacture processes can be reduced, and thereby a productivity can be increased.

Besides, by sequentially applying the polyester imide layer, the polyamide imide layer, and the self-lubricating polyamide layer on the surface of the copper wire, an insulation characteristic and a physical intensity can be reinforced and the reciprocating motor can effectively resist against a condition of high temperature and high pressure such as a compressor. According to this, the reciprocating motor can have a prolonged life span and an increased productivity.

It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A reciprocating motor comprising:
   an outer stator;
   an inner stator arranged at an inner circumference surface of the outer stator with a certain air gap;
   a magnet linearly and movably arranged between the outer stator and the inner stator; and
   a winding coil mounted on either the outer stator or the inner stator, the winding coil having a ring shape and including:
      a plurality of turns of a conductive wire;
      a polyester imide layer surrounding the conductive wire;
      a polyamide imide layer surrounding the polyester imide layer;

a self-lubricating polyamide layer surrounding the polyester imide layer; and a molding material surrounding the self-lubricating polyamide layer such that the conductive wire, the polyester imide layer, the polyamide imide layer, the self-lubricating polyamide layer and the molding material together are an integral structure, the self-lubricating polyamide layer being located between the conductive wire and the molding material.

2. The reciprocating motor of claim 1, wherein the polyester imide layer is in contact with a circumferential surface of the conductive wire, the polyamide imide layer is in contact with a circumferential surface of the polyester imide layer, and the self-lubricating polyamide layer is in contact with the polyester imide layer.

* * * * *